(12) United States Patent
John et al.

(10) Patent No.: US 8,107,401 B2
(45) Date of Patent: Jan. 31, 2012

(54) METHOD AND APPARATUS FOR PROVIDING A VIRTUAL ASSISTANT TO A COMMUNICATION PARTICIPANT

(75) Inventors: Ajita John, Holmdel, NJ (US); Reinhard P. Klemm, Basking Ridge, NJ (US); Doree D. Seligmann, New York, NY (US)

(73) Assignee: Avaya Inc., Basking Ridge, NJ (US)

( * ) Notice: Subject to any disclaimer, the term of this patent is extended or adjusted under 35 U.S.C. 154(b) by 856 days.

(21) Appl. No.: 10/989,105

(22) Filed: Nov. 15, 2004

(65) Prior Publication Data

US 2006/0067352 A1   Mar. 30, 2006

Related U.S. Application Data

(63) Continuation-in-part of application No. 10/955,918, filed on Sep. 30, 2004.

(51) Int. Cl.
*H04L 12/16* (2006.01)
*G06F 15/16* (2006.01)

(52) U.S. Cl. ........ 370/259; 370/401; 709/203; 709/227; 379/201.01

(58) Field of Classification Search .................. None
See application file for complete search history.

(56) References Cited

U.S. PATENT DOCUMENTS

| | | | |
|---|---|---|---|
| 5,619,555 A | 4/1997 | Fenton et al. | |
| 5,754,830 A * | 5/1998 | Butts et al. | 370/466 |
| 5,862,223 A | 1/1999 | Walker et al. | |
| 5,887,136 A | 3/1999 | Yasuda et al. | |
| 5,899,995 A | 5/1999 | Millier et al. | |
| 5,930,238 A * | 7/1999 | Nguyen | 370/260 |
| 6,029,195 A | 2/2000 | Herz | |
| 6,044,378 A | 3/2000 | Gladney | |
| 6,078,928 A | 6/2000 | Schnase et al. | |
| 6,088,732 A | 7/2000 | Smith et al. | |
| 6,147,993 A * | 11/2000 | Kloth et al. | 370/401 |
| 6,182,133 B1 | 1/2001 | Horvitz | |

(Continued)

FOREIGN PATENT DOCUMENTS

EP   0669733 A2   8/1995

(Continued)

OTHER PUBLICATIONS

Hashem, Lisa, "U.S. Appl. No. 10/955,918, filed Jul. 10, 2009", Publisher: USPTO, Published in: US.

(Continued)

*Primary Examiner* — Chirag Shah
*Assistant Examiner* — Joshua Smith

(57) ABSTRACT

Methods and apparatus are disclosed for providing a virtual assistant to at least one party of a communication. The virtual assistant is injected into the communication, for example, by a VXML engine. The operation of the virtual assistant is controlled by one or more software modules that are obtained from a proxy node. The software modules allow commands received from or destined for the party to be interpreted. The virtual assistant may optionally be customized based on a selection of the one or more supported external applications. The proxy node provides at least one method for the party that allows the party to access functionality provided by at least one external application. The proxy node interprets signals from the virtual assistant; converts the signals from the virtual assistant into commands for the external application; and converts one or more of commands, messages and data from the external application into signals understood by the virtual assistant.

34 Claims, 11 Drawing Sheets

U.S. PATENT DOCUMENTS

| | | | |
|---|---|---|---|
| 6,195,657 B1 | 2/2001 | Rucker et al. | |
| 6,321,221 B1 | 11/2001 | Bieganski | |
| 6,321,268 B1* | 11/2001 | Dillon et al. | 370/353 |
| 6,324,541 B1 | 11/2001 | de L'Etraz et al. | |
| 6,449,649 B1* | 9/2002 | Janay et al. | 709/227 |
| 6,480,830 B1 | 11/2002 | Ford et al. | |
| 6,490,577 B1 | 12/2002 | Anwar | |
| 6,553,028 B1* | 4/2003 | Tang et al. | 370/389 |
| 6,556,563 B1* | 4/2003 | Yarlagadda | 370/401 |
| 6,584,472 B2 | 6/2003 | Classen | |
| 6,604,129 B2 | 8/2003 | Slutsman et al. | |
| 6,633,889 B2 | 10/2003 | Dessloch et al. | |
| 6,707,471 B2 | 3/2004 | Funaki | |
| 6,760,727 B1 | 7/2004 | Schroeder et al. | |
| 6,792,265 B1* | 9/2004 | Chan et al. | 370/260 |
| 6,810,395 B1 | 10/2004 | Bharat | |
| 6,816,850 B2 | 11/2004 | Culliss | |
| 6,826,593 B1* | 11/2004 | Acharya et al. | 709/203 |
| 6,847,959 B1 | 1/2005 | Arrouye et al. | |
| 6,901,394 B2 | 5/2005 | Chauhan et al. | |
| 6,915,298 B1 | 7/2005 | Cain et al. | |
| 6,934,750 B2* | 8/2005 | Hijikata et al. | 709/224 |
| 6,993,590 B1* | 1/2006 | Gauthier et al. | 709/231 |
| 7,046,779 B2 | 5/2006 | Hesse | |
| 7,050,963 B2* | 5/2006 | Flavin | 709/203 |
| 7,069,308 B2 | 6/2006 | Abrams | |
| 7,076,244 B2 | 7/2006 | Lazaridis et al. | |
| 7,080,082 B2 | 7/2006 | Elder et al. | |
| 7,103,609 B2 | 9/2006 | Elder et al. | |
| 7,124,167 B1* | 10/2006 | Bellotti et al. | 370/351 |
| 7,127,492 B1* | 10/2006 | Calo et al. | 709/214 |
| 7,149,288 B2 | 12/2006 | Digate et al. | |
| 7,167,833 B2 | 1/2007 | Mashiko et al. | |
| 7,240,270 B2* | 7/2007 | Bellier et al. | 370/528 |
| 7,263,177 B1* | 8/2007 | Paterik et al. | 370/353 |
| 7,284,002 B2 | 10/2007 | Doss et al. | |
| 7,289,975 B2 | 10/2007 | Clarke et al. | |
| 7,305,437 B2 | 12/2007 | Horvitz et al. | |
| 7,325,202 B2 | 1/2008 | Shirriff | |
| 7,389,351 B2 | 6/2008 | Horvitz | |
| 7,418,090 B2 | 8/2008 | Reding et al. | |
| 7,587,664 B2 | 9/2009 | Newbold | |
| 7,644,144 B1 | 1/2010 | Horvitz et al. | |
| 7,865,457 B2 | 1/2011 | Ravin et al. | |
| 2002/0038331 A1* | 3/2002 | Flavin | 709/105 |
| 2002/0065110 A1* | 5/2002 | Enns et al. | 455/550 |
| 2002/0075304 A1 | 6/2002 | Thompson et al. | |
| 2002/0087520 A1 | 7/2002 | Meyers | |
| 2002/0143994 A1 | 10/2002 | Sun et al. | |
| 2002/0156787 A1 | 10/2002 | Jameson et al. | |
| 2002/0156841 A1* | 10/2002 | Landfeldt et al. | 709/203 |
| 2002/0174237 A1 | 11/2002 | Shrinivasan et al. | |
| 2002/0184373 A1* | 12/2002 | Maes | 709/228 |
| 2002/0188620 A1 | 12/2002 | Doss et al. | |
| 2003/0014399 A1 | 1/2003 | Hansen et al. | |
| 2003/0014488 A1 | 1/2003 | Dalal et al. | |
| 2003/0028525 A1 | 2/2003 | Santos et al. | |
| 2003/0048880 A1* | 3/2003 | Horvath et al. | 379/88.01 |
| 2003/0063121 A1 | 4/2003 | Kumhyr et al. | |
| 2003/0065955 A1 | 4/2003 | Kumhyr et al. | |
| 2003/0070176 A1 | 4/2003 | Parker et al. | |
| 2003/0105826 A1 | 6/2003 | Mayraz | |
| 2003/0115089 A1 | 6/2003 | Lurie | |
| 2003/0126205 A1 | 7/2003 | Lurie | |
| 2003/0140037 A1 | 7/2003 | Deh-Lee | |
| 2003/0145056 A1* | 7/2003 | Fujisawa et al. | 709/205 |
| 2003/0158915 A1 | 8/2003 | Gebhart | |
| 2003/0163520 A1* | 8/2003 | Bussani et al. | 709/203 |
| 2003/0195787 A1 | 10/2003 | Brunk et al. | |
| 2003/0204431 A1 | 10/2003 | Ingman | |
| 2003/0225825 A1* | 12/2003 | Healey et al. | 709/203 |
| 2003/0227920 A1* | 12/2003 | Benayoun et al. | 370/392 |
| 2004/0034723 A1 | 2/2004 | Giroti | |
| 2004/0041902 A1 | 3/2004 | Washington | |
| 2004/0088275 A1 | 5/2004 | Elder et al. | |
| 2004/0088303 A1 | 5/2004 | Elder et al. | |
| 2004/0122803 A1 | 6/2004 | Dom et al. | |
| 2004/0133638 A1 | 7/2004 | Doss et al. | |
| 2004/0161090 A1 | 8/2004 | Digate et al. | |
| 2004/0186852 A1 | 9/2004 | Rosen | |
| 2004/0199580 A1 | 10/2004 | Zhakov et al. | |
| 2004/0205766 A1* | 10/2004 | Lee et al. | 370/338 |
| 2004/0260677 A1 | 12/2004 | Malpani et al. | |
| 2005/0018827 A1 | 1/2005 | Himmel et al. | |
| 2005/0033657 A1 | 2/2005 | Herrington et al. | |
| 2005/0034079 A1 | 2/2005 | Gunasekar et al. | |
| 2005/0065797 A1* | 3/2005 | Haenel | 704/270.1 |
| 2005/0071421 A1* | 3/2005 | Calo et al. | 709/203 |
| 2005/0076013 A1 | 4/2005 | Hilbert et al. | |
| 2005/0125487 A1 | 6/2005 | O'Connor et al. | |
| 2005/0131897 A1 | 6/2005 | Grasso et al. | |
| 2005/0222987 A1 | 10/2005 | Vadon | |
| 2005/0232166 A1 | 10/2005 | Nierhaus | |
| 2005/0270973 A1* | 12/2005 | Raev et al. | 370/218 |
| 2005/0278326 A1 | 12/2005 | Horvitz et al. | |
| 2005/0289470 A1 | 12/2005 | Pabla et al. | |
| 2006/0029003 A1 | 2/2006 | Hassan et al. | |
| 2006/0044307 A1 | 3/2006 | Song | |
| 2006/0136377 A1 | 6/2006 | Patt-Shamir et al. | |
| 2006/0177034 A1 | 8/2006 | Reding et al. | |
| 2007/0094024 A1 | 4/2007 | Kristensson et al. | |
| 2007/0165591 A1* | 7/2007 | Higure et al. | 370/346 |
| 2008/0239995 A1 | 10/2008 | Lee et al. | |

FOREIGN PATENT DOCUMENTS

| | | | |
|---|---|---|---|
| EP | 1416696 | A1 | 5/2004 |
| WO | 0135272 | A2 | 5/2001 |
| WO | 2004044705 | A2 | 5/2004 |
| WO | 2004046875 | A2 | 6/2004 |

OTHER PUBLICATIONS

Ng, Christine Y., "U.S. Appl. No. 10/989,104 Office Action Nov. 28, 2008", Publisher: USPTO, Published in: US.

Ng, Christine Y., "U.S. Appl. No. 10/989,104 Office Action May 8, 2008", Publisher: USPTO, Published in: US.

Schorgg, A., "EP Application No. 05254998.7—2414 Office Action Nov. 29, 2006", Publisher: EPO, Published in: EP.

Schorgg, A., "EP Application No. 05254998.7—2414 European Search Report Feb. 7, 2006", Publisher: EPO, Published in: EP.

Gay, Sonia L., "U.S. Appl. No. 10/979,759 Office Action Dec. 31, 2009", Publisher: USPTO, Published in: US.

Gay, Sonia L., "U.S. Appl. No. 10/979,759 Office Action Mar. 3, 2009", Publisher: USPTO, Published in: US.

Gay, Sonia L., "U.S. Appl. No. 10/979,759 Office Action Jul. 24, 2009", Publisher: USPTO, Published in: US.

Kautz et al., "Agent Amplified Communication", "Proceedings of the Thirteenth National Conference on Artifical Intelligence (AAAI-96)", 1996, Published in: US.

Chakraborty et al., "Extending the Reach of Business Processes", "Communications", Apr. 2004, pp. 104-106.

De Laat, Maarten, "Network and content analysis in an online community discourse", 2002, Publisher: University of Nijmegen, Published in: NL.

Kautz et al., "ReferralWeb: Combining Social Networks and Collaborative Filtering", "Communications of the ACM", Mar. 1997, vol. 40, No. 3, Published in: US.

Hashem, Lisa, "U.S. Appl. No. 10/955,918 Office Action Oct. 16, 2008", Publisher: USPTO, Published in: US.

Patel, Hemant Shantilal, "U.S. Appl. No. 10/955,918 Office Action Feb. 17, 2010", Publisher: USPTO, Published in: US.

Schorgg, A., "EP Application No. 05254998.7—2414 Office Action May 13, 2008", Publisher: EPO, Published in: EP.

Gay, Sonia L., "U.S. Appl. No. 10/979,759 Office Action Jul. 6, 2010", Publisher: USPTO, Published in: US.

Nazzaro, A, "EP Application No. 05254895.5 Office Action Oct. 30, 2006", Publisher: EPO, Published in: EP.

"EP Application No. 05254895.5 Office Action Mar. 20, 2009", Publisher: EPO, Published in: EP.

"EP Application No. 05 254 895.5 Office Action May 19, 2008", Publisher: EPO, Published in: EP.

"EP Application No. 05254895.5 Decision to Refuse Apr. 15, 2009", Publisher: EPO, Published in: EP.

Nazzaro, A, "EP Appliction No. 05254895.5 Search Report Apr. 3, 2006", Publisher: EPO, Published in: EP.

Le, Hund D., "U.S. Appl. No. 10/955,917 Advisory Action Nov. 14, 2008", Publisher: USPTO, Published in: US.

Le, Hung D. , "U.S. Appl. No. 10/955,917 Office Action Jan. 15, 2008", Publisher: USPTO, Published in: US.

Le, Hung D., "U.S. Appl. No. 10/955,917 Office Action Feb. 17, 2009", Publisher: USPTO, Published in: US.

Le, Hung D., "U.S. Appl. No. 10/955,917 Office Action Mar. 12, 2007", Publisher: USPTO, Published in: US.

Le, Hung D., "U.S. Appl. No. 10/955,917 Office Action Jul. 27, 2010", Publisher: USPTO, Published in: US.

Le, Hung D. , "U.S. Appl. No. 10/955,917 Office Action Aug. 1, 2008", Publisher: USPTO, Published in: US.

Le, Hung D. , "U.S. Appl. No. 10/955,917 Office Action Aug. 16, 2007", Publisher: USPTO, Published in: US.

"EP Application No. 05254895.5 Summons to Oral Proceedings Jan. 26, 2009", Publisher: EPO, Published in: EP.

Le, Hung D., "U.S. Appl. No. 10/955,917 Office Action Oct. 23, 2009", Publisher: USPTO, Published in: US.

Le, Hung D., "U.S. Appl. No. 10/955,917 Office Action Mar. 25, 2010", Publisher: USPTO, Published in: US.

Patel, Hemant Shantilal, "U.S. Appl. No. 10/955,918 Notice of Allowance Jan. 10, 2011", Publisher: USPTO, Published in: US.

Schwartz et al., "Discovering Shared Interests Among People Using Graph Analysis of Global Electronic Mail Traffic", Oct. 1992, Publisher: Department of Computer Science, University of Colorado, Published in: US.

Le, Hung D., "U.S. Appl. No. 10/955,917 Office Action Nov. 26, 2010", Publisher: USPTO, Published in: US.

Crowder et al., "An Agent Based Approach to Finding Expertise", 2002, Publisher: IAM Group, Published in: UK.

Yimam-Seid et al., "Expert Finding Systems for Organizations: Problem and Domain Analysis and the DEMOIR Approach", "Journal of Organizational Computing and Electronic Commerce", 2003, pp. 1-23, vol. 13, No. 1.

Chandrasekaran et al., "An Expertise Recommender using Web Mining", "FLAIRS-01 Proceedings Knowledge Management", 2001, pp. 291-294, Publisher: AAAI (www.aaai.org).

Hertzum et al., "The information-seeking practices of engineers: searching for documents as well as for people", "Information Processing and Management http://www.elsevier.com/locate/infoproman", 2000, pp. 761-778, Publisher: Elsevier Science Ltd.

Craswell et al., "P@NOPTIC Expert: Searching for Experts not just for Documents", "Mathematical and Information Science", 2001, Publisher: CSIRO Australia, Published in: AU.

Le, Hung D., "U.S. Appl. No. 10/955,917 Office Action Feb. 17, 2011", Publisher: USPTO, Published in: US.

Gay, Sonia L., "U.S. Appl. No. 10/979,759 Office Action Nov. 12, 2010", Publisher: USPTO, Published in: US.

* cited by examiner

Begin VXML Script

XML 1.0 and VXML 2.0 headers

410 {
    Begin built-in function declarations
        Function that returns current time
        Function that returns duration of personal assistance connection to proxy
        Function that returns information about this personal voice assistant
        ...
    End built-in function declarations 420 {
    Begin variable declarations
        For each input parameter $p_i$, declare a VXML variable $v_i$; $P = \{v_1, ..., v_n\}$
    End variable declarations 430 {
    Begin event handler declarations
        Begin hangup event handler declaration
            Invoke assistant servlet with parameters *Disconnect, P*
        End hangup event handler declaration Begin transfer event handler declaration
            Invoke assistant servlet with parameters *Transfer, P*
        End transfer event handler declaration Begin error1 event handler declaration
            Invoke assistant servlet with parameters *Error1, P*
        End error1 event handler declaration

...

Begin errorN event handler declaration
            Invoke assistant servlet with parameters *ErrorN, P*
        End errorN event handler declaration
    End event handler declarations

FIG. 4B

440 {
```
Begin form1
    Invoke assistant servlet with parameters Connect, P
    Goto form2
End form1

Begin form2
    Invoke assistant servlet with parameters CheckForStringObjects, P
    If key input, goto form5
    Wait for w seconds
    Goto form3
End form2

Begin form3
    Invoke assistant servlet with parameters CheckForAudioObjects, P
    If key input, goto form5
    Wait for w seconds
    Goto form4
End form3

Begin form4
    Invoke assistant servlet with parameters CheckForSignalObjects, P
    If key input, goto form5
    Wait for w seconds
    Goto form2
End form4

Begin form5
    Begin menu
        Speak menu choices
        Collect key input i
        Goto form keypressi
    End menu
    ...
    Begin form keypressi
        Invoke assistant servlet with parameters KeyPress, i, P
        Goto form2
    End form keypressi
    ...
End form5
```

End VXML script

Package declarations
Import declarations
public abstract class ProxyEJB implements EntityBean
{
    Declaration of CMP fields including user ID, creation time, and storage for string objects, audio objects, and signal objects private static String MINIMUM_VXML_SUBDIALOG = ...

public ProxyEJB ()
    {
        J2EE code goes here
    } public void setEntityContext (EntityContext context)
    {
        J2EE code goes here
    } public void unsetEntityContext ()
    {
        J2EE code goes here
    } public Long ejbCreate (...) throws CreateException
    {
        J2EE code for initializing the CMP fields
    } public void ejbPostCreate (...) throws CreateException
    {
        J2EE code goes here
    } public void ejbActivate ()
    {
        J2EE code goes here
    } public void ejbPassivate ()
    {
        J2EE code goes here
    } public void ejbLoad ()
    {
        J2EE code goes here
    } public void ejbStore ()
    {
        J2EE code goes here
    } public void ejbRemove ()
    {
        J2EE code goes here
    }

FIG. 5B

```
// Beginning of proxy EJB methods

// The assistant servlet packages the set of parameters P
// originating at the master script into a Properties object
// because the number of parameters in P is variable
```

500-1
```
// called by the assistant servlet from the master script in
// form1; return value must be a VXML subdialog, at a minimum the
// MINIMUM_VXML_SUBDIALOG
public abstract String ejbOnConnect (Properties p);
```

500-2
```
// called by the assistant servlet from the master script in
// hangup and transfer event handlers; the assistant servlet
// passes the parameter Disconnect or Transfer originating in the
// event handlers to the method parameter event; return value
// must be a VXML subdialog, at a minimum the
// MINIMUM_VXML_SUBDIALOG
public abstract String ejbOnDisconnect (String event, Properties p);
```

500-3
```
// called by the assistant servlet from the master script in all
// the forms keypress$i$; the assistant servlet passes $i$ to method
// parameter key; return value must be a VXML subdialog, at a
// minimum the MINIMUM_VXML_SUBDIALOG
public abstract String ejbOnKeyPress(String key, Properties p);
```

500-4
```
// called by the assistant servlet from the master script in all
// the error$i$ event handlers; the assistant servlet passes the
// event error$i$ to method parameter even; return value must be a
// VXML subdialog, at a minimum the MINIMUM_VXML_SUBDIALOG
public abstract String ejbOnException(String event, Properties p);
```

FIG. 5C 500-6
```
// proxy calls ejbStringOutput to deposit a String object
// destined for the personal voice assistant of this user
public void ejbStringOutput(String outputForPersonalVoiceAssistant)
{
    J2EE code here to add outputForPersonalVoiceAssistant to
    string storage in bean
}
```

500-7
```
// proxy calls ejbAudioOutput to deposit the URL for
// an audio file destined for this user's personal voice
// assistant
public void ejbAudioOutput(String audioFileURI)
{
    J2EE code here to add audioFileURI to audio storage
    in bean
}
```

500-8
```
// proxy calls ejbSignalOutput to deposit the signal ID of
// a signal destined for this user's personal voice
// assistant; we assume that the master script can reference
// a number of signal tone files that are associated with
// integers as identifiers
public void ejbSignalOutput(int signalID)
{
    J2EE code here to add signalID to signal storage in bean
}
```

FIG. 5D

```
// assistant servlet calls ejbRetrieveStringOutput in form2;
// method returns a VXML subdialog, at a minimum the
// MINIMUM_VXML_SUBDIALOG
public String ejbRetrieveStringOutput(Properties p)
{
    J2EE code here to remove first String
    object from String storage and use it
    and p to assemble VXML subdialog
}
```
500-9

```
// assistant servlet calls ejbRetrieveAudioOutput in form3;
// method returns a VXML subdialog, at a minimum the
// MINIMUM_VXML_SUBDIALOG
public String ejbRetrieveAudioOutput(Properties p)
{
    J2EE code here to remove first audio
    file URL from audio storage and use it
    and p to assemble VXML subdialog
}
```
500-10

```
// assistant servlet calls ejbRetrieveSignalOutput in form3;
// method returns a VXML subdialog, at a minimum the
// MINIMUM_VXML_SUBDIALOG
public String ejbRetrieveSignalOutput(Properties p)
{
    J2EE code here to remove first signal ID
    from signal storage and use it and p to
    assemble VXML subdialog; notice that the
    signal ID is used here to reference the URL
    of an audio file that will render the desired
    signal tone
}
}
```
500-11

METHOD AND APPARATUS FOR PROVIDING A VIRTUAL ASSISTANT TO A COMMUNICATION PARTICIPANT

CROSS-REFERENCE TO RELATED APPLICATIONS

The present application is a continuation-in-part of U.S. patent application Ser. No. 10/955,918, entitled "Method and Apparatus for Providing Communication Tasks in a Workflow,", filed Sep. 30, 2004 and incorporated by reference herein.

FIELD OF THE INVENTION

The present invention relates generally to methods and apparatus for communicating with one or more users, and more particularly, to techniques for providing a virtual assistant to one or more participants of a communication.

BACKGROUND OF THE INVENTION

In today's communication environment, communication devices must support a number of functions in order to implement various desired applications and to satisfy the ever-increasing expectations of users. For example, one or more external applications may need to monitor or control events on a device, monitor the device status, control the device and its current capabilities, or render their user interfaces on the device. In addition, users often wish to multi-task while participating in a communication, such as a conference call, and perform one or more additional tasks on the same or a different device than supports the primary communication. Such tasks may or may not be related to the communication. Examples of the tasks that are related to the communication include changing one or more call settings, obtaining information about the other participants involved in the communication, sending or receiving messages or being notified of events, such as messages that are received during the communication, all without interrupting the primary communication. Examples of tasks that are not related to the communication include the invocation of external applications from the device and interaction with these applications through the device. Thus, to support multi-tasking, even further functionality may be required and the desired functionality may be spread among a number of devices. Supporting such functionality on communication devices, especially traditional and unmodified communication devices, as well as spreading the functionality among a number of devices proves to be a formidable challenge.

A number of techniques have been proposed or suggested to assist a user during a communication. For example, Avaya Inc. has proposed a WiVa interface that provides a telephone interface into a specific application called POCCS that includes the WiVa interface. The WiVa interface follows a user request/response model where the user speaks a predefined command that initiates a desired action by the WiVa interface. For example, the WiVa interface allows a user to initiate a call or to obtain information regarding, for example, the availability or location of another person. In addition, VCON Corp. has proposed a system, referred to as VCON Interactive Group Communication System 2000 (ICG 2000), that allows text messages sent between users to be rendered as a voice "whisper" if the target user is on a call. While such techniques have extended the functionality that is available to users, and have increased user efficiency, they suffer from a number of limitations, which, if overcome, could further extend the utility of communication devices. A need therefore exists for improved methods and apparatus for providing virtual assistants or agents to one or more participants in a communication.

SUMMARY OF THE INVENTION

Generally, methods and apparatus are disclosed for providing a virtual assistant to at least one party of a communication. The virtual assistant is injected into the communication, for example, by a VXML engine. The operation of the virtual assistant is controlled by one or more software modules that are obtained from a proxy node. The software modules allow commands received from or destined for the party to be interpreted. The virtual assistant may optionally be customized based on a selection of the one or more supported external applications.

The proxy node provides at least one method for the party that allows the party to access functionality provided by at least one external application. The proxy node interprets signals from the virtual assistant; converts the signals from the virtual assistant into commands for the external application; and converts one or more of commands, messages and data from the external application into signals understood by the virtual assistant.

Among other features, the virtual assistant enables two-way in-band signaling between the party and the proxy node; allows two parties to communicate with one another; and provides a user interface between at least one external application and the party.

A more complete understanding of the present invention, as well as further features and advantages of the present invention, will be obtained by reference to the following detailed description and drawings.

BRIEF DESCRIPTION OF THE DRAWINGS

FIGS. 4A and 4B, collectively, provide exemplary pseudo-VXML code for the master script of FIG. 2;

FIGS. 5A through 5D, collectively, illustrate exemplary pseudo code for a set of abstract methods that are implemented by a derived (customized) EJB;

DETAILED DESCRIPTION

Figure 1:
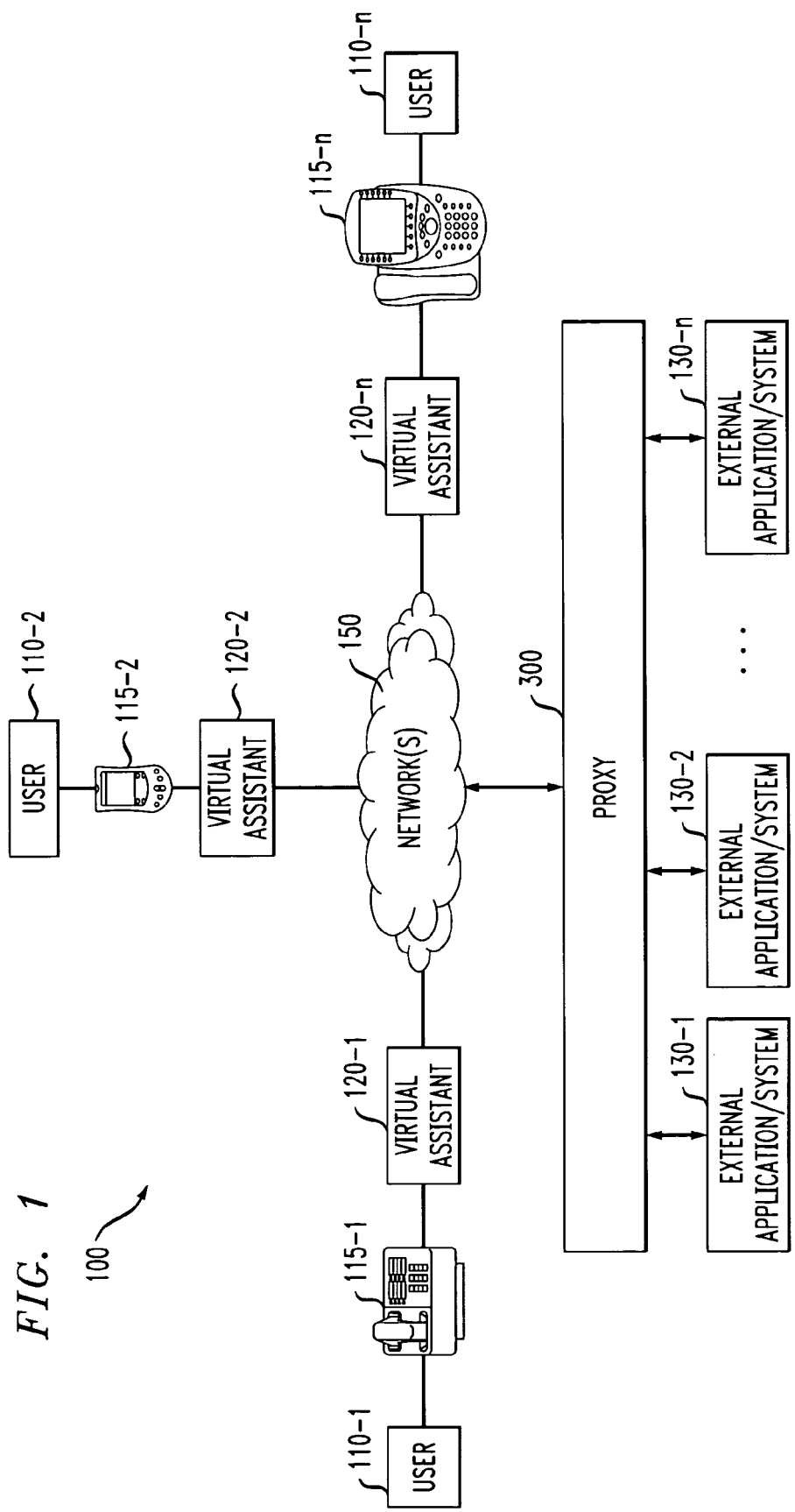
FIG. 1 illustrates a network environment in which the present invention can operate.

FIG. 1 illustrates a network environment 100 in which the present invention can operate. As shown in FIG. 1, one or more users 110-1 through 110-n (hereinafter, collectively referred to as users 110) communicate with one another or with one or more external applications or systems 130-1 through 130-n (hereinafter, collectively referred to as external applications 130) over one or more networks 150. As shown in FIG. 1, each user 110 has one or more associated devices 115-1 through 115-n (hereinafter, collectively referred to as devices 115). It is noted that the one or more networks 150 may include any combination of wired or wireless data or voice public and private networks.

According to one aspect of the present invention, each user 110 has an associated virtual assistant 120-1 through 120-*n*. In the exemplary embodiment discussed herein, the virtual assistants are deployed in the context of voice communications. Thus, the virtual assistants 120-1 through 120-*n* are collectively referred to as personal voice assistants 120. It is noted that although the present invention is illustrated in the context of personal voice assistants for voice communications, the invention can also be applied to many other communication media, such as instant messaging.

According to another aspect of the invention, functionality of the personal voice assistants is allocated between the personal voice assistants 120 and a coupled software system, referred to as a proxy 300, discussed below in conjunction with FIG. 3. Generally, the proxy 300 allows a developer to selectively include functionality in the personal voice assistant 120 of a given user or set of users.

As used herein, a personal voice assistant 120 is a software conduit that connects a user device 115, such as a telephone, to the proxy 300. The personal voice assistant 120 allows two-way in-band signaling between the user of the user device 115 and the proxy 300. The proxy 300 mediates between the personal voice assistant 120 and external applications 130 that the personal voice assistant 120 (or the user 110) wishes to interact with. The proxy 300 interprets signals from the personal voice assistant 120 and converts them into commands for the external applications 130, and the proxy 300 converts commands, messages and data, from the external applications 130 into signals understood by the personal voice assistant 120.

It is noted that the proxy 300 communicates with each personal voice assistant by means of a data connection through the network(s) 150. It is further noted that the personal voice assistant 120 may be injected into a communication by the device 115 of a user or by a node in the network 150 that is connected to the device 115, as discussed below in conjunction with FIG. 2. In the former case, the device 115 must support the execution of the personal voice assistant 120 (e.g., parsing VXML in the exemplary embodiment, as discussed below). In the latter case, however, a network node needs to support the execution of the personal voice assistant 120 but no modifications are necessary to the device 115.

To the user 110, the personal voice assistant 120 is a voice or phone keypad-operated user interface into the external applications and systems 130 and allows the user to trigger arbitrary functionality, such as computations and data or message retrieval in the external applications and systems 130. Moreover, the personal voice assistant 120 allows the user 110 to send text and audio messages to other users 110 having personal voice assistants 120 and to receive such messages from other users 110 (or to have an interactive communication) by way of the proxy 300 without the intervention of external applications and systems 130. The feedback from the proxy 300 to the user 110 consists of voice or audio output that is audible only to this user, for example, by means of a telephone headset associated with the device 115. There is generally a one-to-one relationship between personal voice assistants 120 and devices 115. Thus, the proxy 300 can clearly identify the device 115 and its associated user or users 110 that requests functionality from the proxy 300 or from external applications and systems 130. For the sake of this discussion, it is assumed that there is a one-to-one relationship between users 110 and devices 115.

To the proxy 300, the personal voice assistant 120 appears as a voice and audio output and dialog device, tied to a specific user 110. The personal voice assistant 120 allows the proxy 300 to relay, for example, computational results, messages, audio files and dialogs to the user 110 and notify the user 110 of events. The objects sent to the user 110 originate at the external applications and systems 130, other users 110, or the proxy 300 itself.

Selective Functionality of Personal Voice Assistant

As discussed further below, the functionality of the proxy 300 and the spectrum of commands available to the user 110 of the personal voice assistant 120 must be aligned with the external applications and systems 130 through customization. In other words, the personal voice assistant 120 and proxy 300 must be tailored to the functionality or subset of functionality supported by the external applications and systems 130. The personal voice assistant 120 and proxy 300 therefore constitute a programming framework that allows the customization of commands of the personal voice assistant 120 based on the selection of supported external applications or systems 130. An exemplary personal voice assistant development platform 700 is discussed below in conjunction with FIG. 7. Generally, the framework provides a generic personal voice assistant 120 and proxy 300 that can optionally be extended by programmers to match the desired functionality in the external applications and systems.

Exemplary Personal Voice Assistant Functionality

For example, the personal voice assistant programming framework described herein may allow a developer to selectively include the following functions in a personal voice assistant for a given user or set of users:

i. retrieval of the names and locations of conference call participants;

ii. obtaining a weather forecast or stock quotes;

iii. sending a text or audio message to another user;

iv. doing a database search;

v. sending a dialog to another user (such as "can you meet me at 2 PM today? Press 1 for yes and 2 for no");

vi. computing the current value of a stock portfolio;

vii. restarting a crashed software application (it is assumed that the proxy 300 has relayed a notification to the user 110 of the crash of an application that an external system 130 monitors; the personal voice assistant 120 might give the user 110 choices of how to respond to the crash, including an application restart option, by means of a dialog; this is particularly useful in situations where a firewall prevents the user 110 from directly accessing the computing environment that hosts the crashed application); and viii. turning on or off message forwarding from voice mail systems to the personal voice assistant 120.

In addition, each personal voice assistant 120 generally supports a number of default functions. It is noted that the personal voice assistant is generally silent and operates in the background unless activated by the user 110 or the proxy 300. For example, the personal voice assistant 120 is generally active during call establishment and at times when the user 110 or the proxy 300 invokes the personal voice assistant 120.

A personal voice assistant 120 can also optionally send user and device status reports to the proxy 300, which stores the status reports and can make them available to other users 110 and external applications and systems 130 (subject to any appropriate access rights). Specifically, the personal voice assistant 120 can report whether the user 120 is on a phone call and if so, identify the phone call. In this manner, the personal voice assistant 120 allows user phone and call presence. This also allows the personal voice assistant 120 to target specific phone calls over which to render voice and audio received from the proxy 300.

The ability of the personal voice assistant 120 to report the status of user device 15 allows device crashes and device connectivity issues to be monitored by the proxy 300 and relayed to external applications and systems 130 that need to monitor the status of user devices 115.

Exemplary Information Relayed to User by Proxy

Thus, to support one or more of the above functions, the proxy 300 may have to relay one or more of the following exemplary outputs from external applications and systems 130 to the user 110:

i. forwarding a voice mail message left for the user 110 on a voice mail system;

ii. sending a text message (rendered as voice) from another user 110-n to this user 110;

iii. sending an alert (rendered as voice) from a workflow system to this user 110;

iv. playing a signal tone that alerts the user 110 to an upcoming appointment on his or her calendar;

v. force call termination;

vi. bridging in another call party 110-n;

vii. alerting the user 110 to a subscribed event; and viii. notifying the user 110 of another user 110-n becoming present on her phone device 115.

Exemplary Dialog Between User and Proxy

The personal voice assistant framework of the present invention also supports dialogs between the user 110 and the proxy 300 through the personal voice assistant. For example, input from the user 110 to the personal voice assistant 120 and output from the proxy 300 to the user 110 can be interleaved. Such dialogs can either be invoked by the user 110 or by the proxy 300. For example, the personal voice assistant programming framework described herein may allow a developer to selectively include functions in a personal voice assistant to support one or more of the following interactive exchanges:

i. the proxy 300 sends a signal tone to the user 110 indicating the arrival of a new message; when the user 110 gets a chance, the user 110 retrieves the message by pressing a button on the device 115, to which the proxy 300 responds with the text of the message, and the personal voice assistant 120 renders the text (or an audio version thereof);

ii. the user 110 wants to retrieve a stock quote; the user 110 presses a button on the phone 115 and the proxy 300 requests a (spoken) input of the stock symbol; the proxy 300 retrieves the requested stock quote through an external application 130 and returns the stock quote to the personal voice assistant 120, which renders the quote to the user 110; and iii. another user 110-n sends a complete dialog that asks the recipient user 110 to first agree to meet the originating user 110-n at a specified time, then asks the recipient 110 to pick one of two time alternatives, then one of two venue alternatives.

Figure 2:
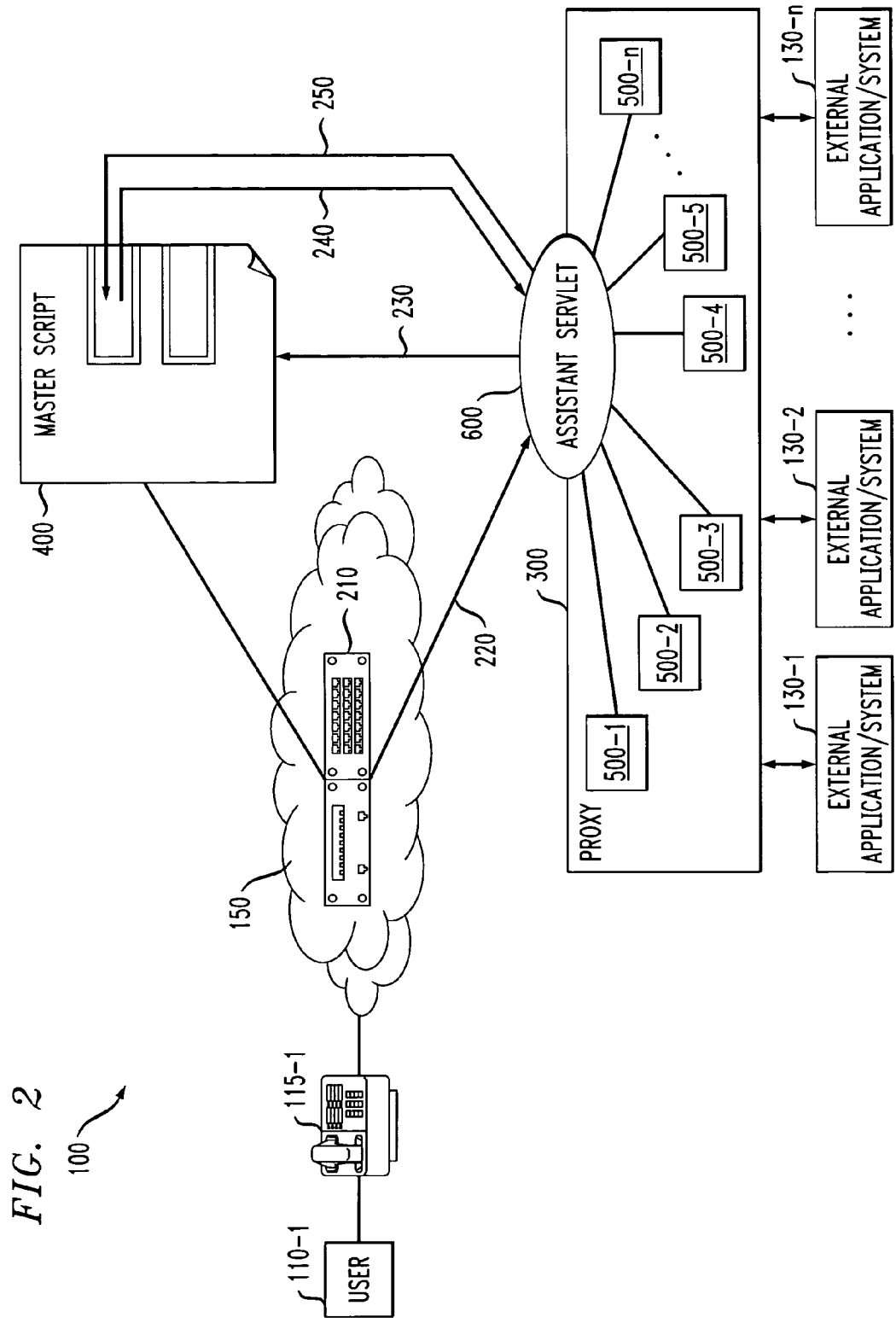
FIG. 2 illustrates aspects of the network environment of FIG. 1 in further detail.

FIG. 2 illustrates aspects of the network environment 100 of FIG. 1 in further detail. As previously indicated, the personal voice assistant 120 may be injected into a communication by the device 115 of a user 110 or by a node in the network 150. In the exemplary implementation shown in FIG. 2, the personal voice assistant 120 of a user 110 is injected into a communication by a node 210 in the network 150. For example, for a voice communication, the personal voice assistant 120 is injected as audio information by a node 210 in the telephone subsystem, such as a switch 210 connected to the user device 115.

In one preferred implementation, the personal voice assistants 120 are always on. In other words, a user's phone 115 is permanently connected to the personal voice assistant 120. If the underlying phone subsystem does not support the "always on" feature, i.e., the personal voice assistant 120 does not execute in the phone device 115 or permanently on a phone switch 210, either the proxy 300 or the phone subsystem injects the personal voice assistant 120 into each party of every phone call. In one exemplary implementation, this is achieved by having the phone switch 210 invoke and execute the personal voice assistant 120 when the user 110 makes or receives a call on the device 115. In another variation, if the user 110 has an intelligent phone 115 (such as a softphone or a sophisticated hard phone with the ability to execute arbitrary programs), the phone device 115 itself can invoke and execute the personal voice assistant 120 when the user 110 makes or receives a call.

The "always on" feature of the personal voice assistant 120 allows the personal voice assistant 120 to serve as a universal voice user interface without having to use a keyboard or a computer. This is of particular value in environments where users 110 cannot operate a keyboard with their hands or where there is no data connection between the user 110 and the external applications and systems 130 (due, for example, to connectivity issues or firewalls).

Generally, the personal voice assistants 120 should not depend on the underlying phone subsystem, such as Plain Old Telephone Systems (POTS) or Voice Over IP (VoIP) systems. VXML is a standard that is independent of the underlying phone subsystem. In one exemplary implementation described herein, the personal voice assistant 120 is embodied using a VXML script 400, discussed below in conjunction with FIG. 4. Thus, the exemplary VXML personal voice assistants 120 can run in any type of phone subsystem that supports the VXML standard.

The VXML script 400 silently runs in the background of each phone call. The VXML script 400 gets invoked by the switch 210 before ("always on") or when a call is placed by or to the user 110 and executed on a VXML engine that is coupled with the switch 210. The VXML engine 210 retrieves the VXML script 400 from the proxy 300 before the call is established, as shown by request 220. The request 220 may include configurable parameters passed by the VXML engine 210 to the proxy 300 to identify the appropriate personal voice assistant VXML script for this call (or the VXML script may be dynamically generated based on the parameters). Thus, the proxy 300 may optionally return a personal voice assistant 120 that is customized based on parameters that the VXML engine 210 forwards to the proxy 300, such as the caller's or callee's phone number and/or based on parameters that the proxy 300 has knowledge of (such as time of the day or the external applications and systems 130).

The disclosed VXML script 400 is generic in the sense that the developer of a personal voice assistant 120 extends the VXML script 400 with customized subdialogs. As discussed further below in conjunction with FIG. 4, in the exemplary embodiment, the subdialogs are not part of the VXML script 400, but rather are referenced in the VXML script 400, and get requested by the VXML script 400 from the proxy 300. Subdialogs are requested by the VXML script 400 when a VXML event occurs. For example, a VXML event may include a button press, a spoken command, a call establishment event or a hangup event. As discussed further below, the personal voice assistants 120 are customized by programming the proxy 300 to return a customized VXML subdialog.

The proxy 300 is implemented, for example, using Java 2 Enterprise Edition (J2EE) from Sun. The proxy 300 is customized to support the functionality of external applications and systems 130 by extending dedicated Enterprise Java Bean(s) (EJBs) 500, discussed below in conjunction with FIG. 5, in the proxy 300, referred to herein as proxy EJBs 500.

Generally, a proxy EJB 500 contains a set of exemplary abstract methods 500-1 through 500-n that a derived (customized) EJB has to implement. The derived EJB 500 customizes the proxy 300 for the desired one or more external applications and systems 130.

The VXML subdialogs that the developer customizes are assembled in the bodies of the exemplary proxy EJB methods 500-1 through 500-n. Alternatively, the bodies of the exemplary proxy EJB methods 500-1 through 500-n may return a string, such as text, or URL of an audio file that the assistant servlet 600 (discussed below) can incorporate into a VXML subdialog. This further reduces the effort required for customizing a personal voice assistant but has the disadvantage of also limiting the flexibility of the VXML subdialogs. The VXML script, also referred to as a master script 400, that incorporates references to these subdialogs are part of the disclosed programming framework and is generally not visible to the developer. Following the request 220, the master script 400 gets returned in a response 230 to the VXML engine 210 by a dedicated assistant servlet 600, discussed below in conjunction with FIG. 6, that is part of the proxy 300. The assistant servlet 600 is also the servlet that gets invoked by the VXML engine 210 when the engine 210 requests subdialogs specified in the master script 400. In the case of subdialog invocation, the assistant servlet 600 retrieves the appropriate (derived) proxy EJB 500 and calls one of the methods above 500-1 through 500-n and returns customized subdialogs in a response 250.

Figure 3:
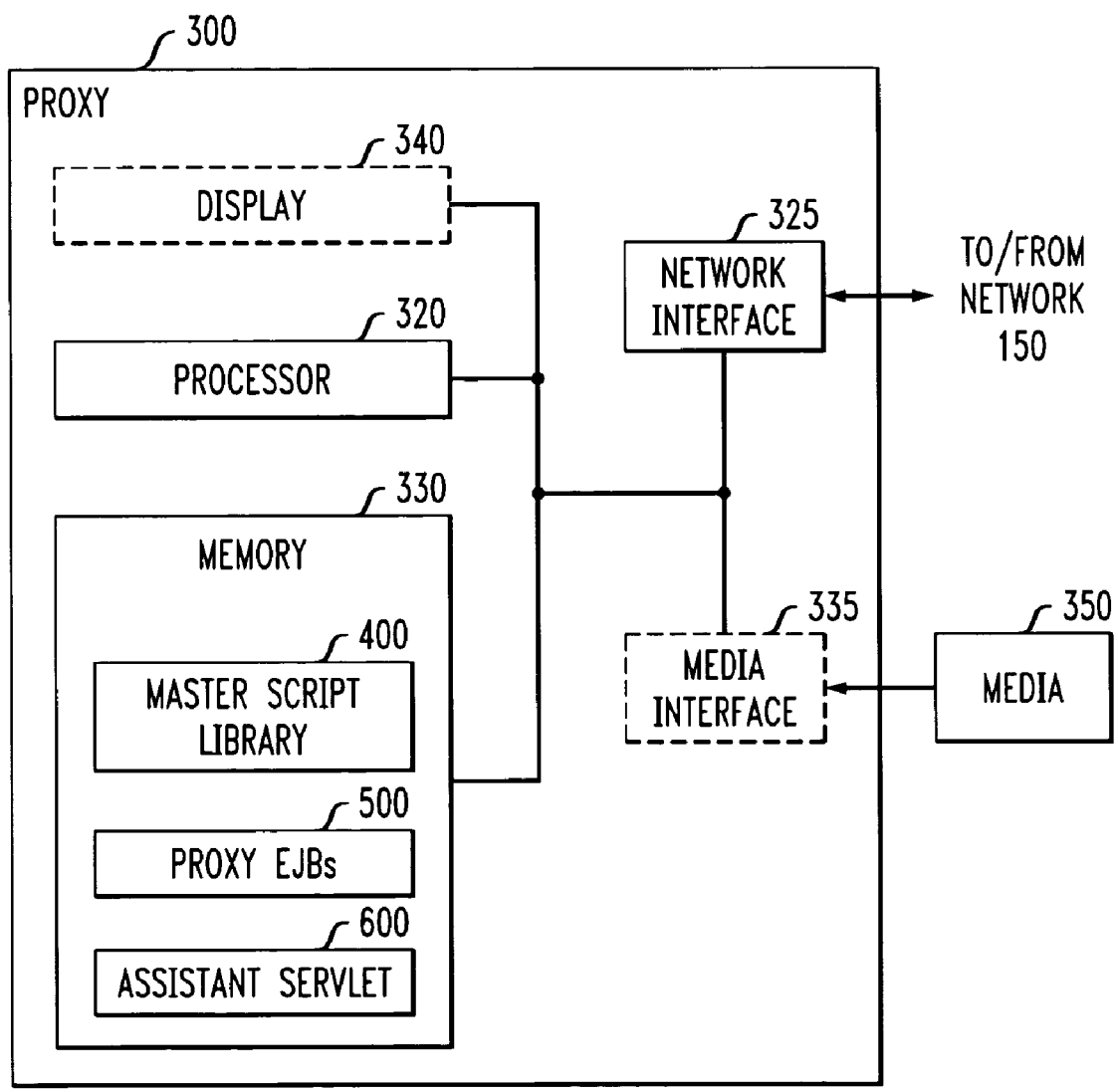
FIG. 3 is a schematic block diagram of an exemplary proxy of FIG. 1 or 2.

FIG. 3 is a schematic block diagram of an exemplary proxy 300. The proxy 300 comprises a computer system that optionally interacts with media 350. The proxy 300 comprises a processor 320, a network interface 325, a memory 330, a media interface 335 and an optional display 340. Network interface 325 allows the proxy 300 to connect to a network 150, while media interface 335 allows the proxy 300 to interact with media 350, such as a Digital Versatile Disk (DVD) or a hard drive. Optional video display 340 is any type of video display suitable for interacting with a human user of the proxy 300. Generally, video display 340 is a computer monitor or other similar video display.

As shown in FIG. 3 and discussed further below in conjunction with FIGS. 4 through 5, respectively, the exemplary memory 330 stores the master script library 400, a set of proxy EJBs 500 and the assistant servlet 600.

FIGS. 4A and 4B, collectively, provide exemplary pseudo-VXML code for the master script 400. It is noted that the master script 400 may actually be one in a library of completed master scripts or may be derived from one of potentially several master script templates in a library of master scripts templates. A master script template is a VXML master script with placeholders that the assistant servlet 600 replaces at run-time with actual values to yield a concrete master script 400. The assistant servlet 600 receives input parameters in the request 220 from the VXML engine 210 that requests the master script 400. The assistant servlet 600 uses these parameters to pick a master script 400 or to pick a master script template and to parameterize it to generate the master script 400. Examples of input parameters include a user identifier, user phone number, VXML engine type and identifier and a session identifier generated by the proxy 300.

As shown in FIG. 4A, the exemplary pseudo-VXML code 400 includes sections 410, 420 for declaring built-in functions and variables, respectively. In addition, the events error1, . . . , errorN referenced in section 430 of the pseudo-VXML code 400 are exceptions and errors that the VXML engine 210 can detect (for example, error.semantic). As shown in FIG. 4A, each event invokes the assistant servlet 600, which may be done through a VXML subdialog element. Thus, whatever the assistant servlet 600 returns is expected to be a VXML subdialog that the master script 400 will render. Speech input is not shown in the pseudocode 400 but would be handled in a similar manner, as would be apparent to a person of ordinary skill in the art.

As shown in FIG. 4B, the exemplary pseudo-VXML code 400 includes a section 440 for defining forms that are executed sequentially, in a known manner. Each form in section 440 invokes the assistant servlet 600 with an indication of the event and parameters. The assistant servlet 600 returns a VXML subdialog that is rendered by the master script 400. Generally, form1 corresponds to the initial greeting or other information presented to the user upon connection to the personal voice assistant 120. In addition, forms 2 through 4 correspond to monitoring for the deposit of string, audio and signal objects, respectively, in the proxy EJB 500 that is associated with this personal voice assistant 120.

Each form invokes the assistant servlet 600. Upon returning from the assistant servlet 600 and rendering the subdialog returned by the assistant servlet 600, each form generally monitors for key input (or spoken commands), and if detected, processes the input according to the menu definitions in form5. Forms form2 through form4 execute continuously to monitor for the deposit of string, audio and signal objects, respectively, in the proxy EJB 500 that is associated with this personal voice assistant 120, until a user input is detected, which causes a branch to form5 to process the user input, before returning to form2. The parameter w is a configurable wait time (e.g., 30 seconds).

FIGS. 5A through 5D, collectively, illustrate exemplary pseudo code for a set 500 of abstract methods 500-1 through 500-n that are implemented by a derived (customized) EJB. The derived EJB 500 customizes the proxy 300 for the desired one or more external applications and systems 130. It is noted that the proxy EJB methods 500, as well as the CMP field accessor methods, have to be propagated to the bean's remote and local interfaces. The portion of the proxy EJB methods 500 shown in FIG. 5A is mandated by the J2EE platform, as understood by those of ordinary skill in the art.

As previously indicated, the developer of a personal voice assistant 120 needs to extend the class ProxyEJB by implementing exemplary proxy EJB methods 500-1 through 500-n. As shown in FIG. 5B, the following methods are implemented in the exemplary embodiment:

i. ejbOnConnect 500-1 (called once call is established);
ii. ejbOnDisconnect 500-2 (called right before call is dropped);
iii. ejbOnKeyPress 500-3 (called upon button press event);
iv. ejbOnSpeechInput 500-4 (called upon spoken event, but not shown in FIG. 5B for ease of illustration due to similarity with ejbOnKeyPress 500-3); and
V. ejbOnException 500-5 (called if exception is detected by VXML engine).

In addition, as shown in FIG. 5C, the following methods deposit objects of various types for pick-up by the personal voice assistant 120 (for each output type in the exemplary embodiment):

i. ejbStringOuput 500-6;
ii. ejbAudioOutput 500-7; and
iii. ejbSignalOutput 500-8 (where signals are brief signal tones, such as a beep with a specified frequency).

In addition, as shown in FIG. 5D, the following corresponding retrieval methods retrieve objects of various types from the personal voice assistant 120 (for each output type in the exemplary embodiment):

i. ejbRetrieveStringOutput 500-9;
ii. ejbRetrieveAudioOutput 500-10; and
iii. ejbRetrieveSignalOutput 500-11.

In the exemplary implementation, these methods are implemented by the proxy 300 and do not need to be provided by the developer.

Figure 6:
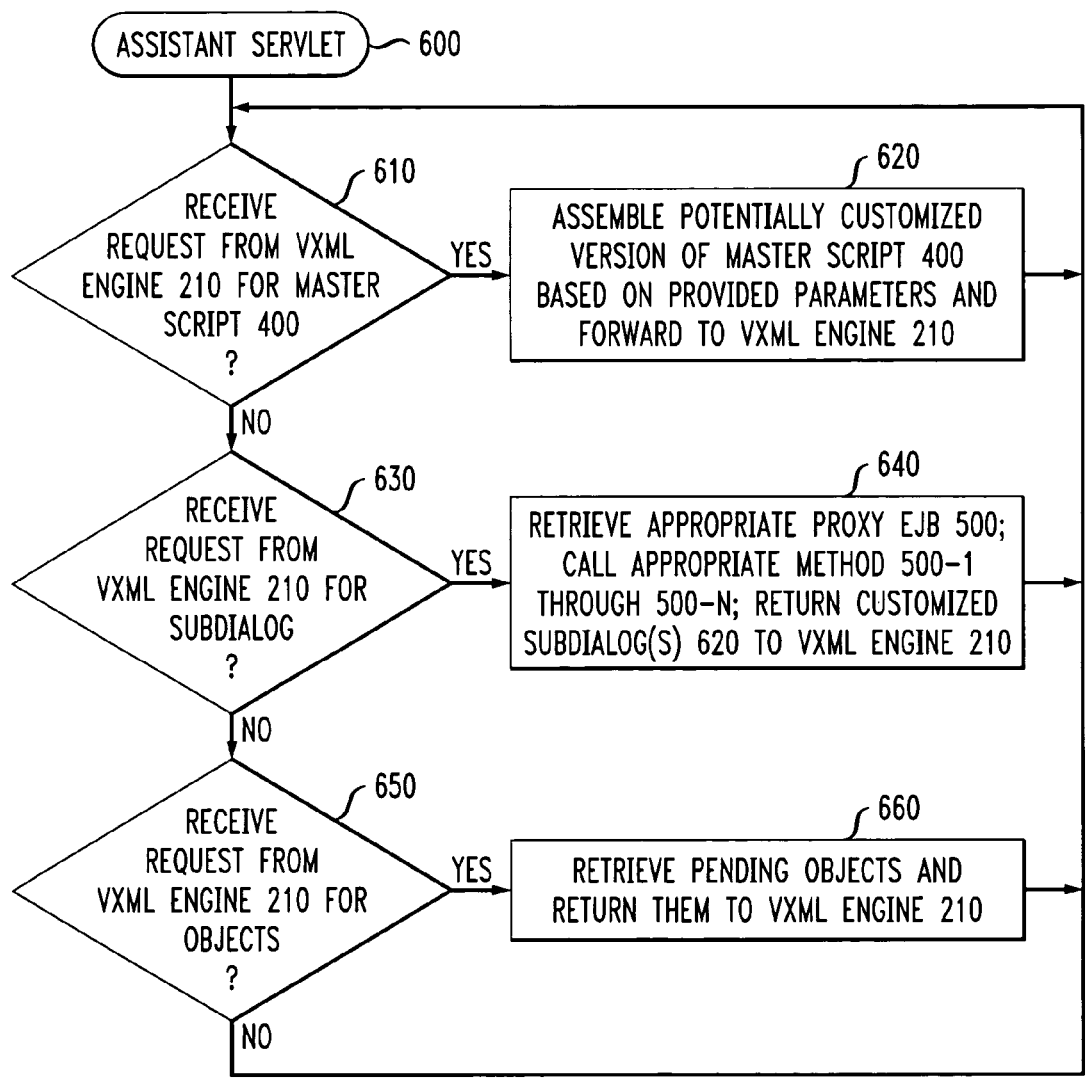
FIG. 6 is a flow chart describing an exemplary implementation of the assistant servlet of FIG. 2.

FIG. 6 is a flow chart describing an exemplary implementation of the assistant servlet 600. As shown in FIG. 6, the exemplary assistant servlet 600 performs a number of tests to monitor for various requests from the VXML engine 210. If a request is detected during step 610 for the master script 400, the assistant servlet 600 returns the master script 400 to the VXML engine 210 during step 620.

If a request is detected during step 630 for a subdialog, the assistant servlet 600 retrieves the appropriate (derived) proxy EJB 500 and calls one of the methods above 500-1 through 500-n and returns the customized subdialogs during step 640.

If a request is detected during step 650 for pending objects, the assistant servlet 600 retrieves the pending objects and returns them to the VXML engine 210 during step 660. Program control then returns to step 610 and continues in the manner described above. It is noted that such requests for pending objects can be considered a special case of the request for subdialogs processed during steps 630 and 640, because pending objects can be packaged and returned through subdialogs.

The proxy EJBs 500 can optionally be configured with J2EE transaction settings "Required" and UserTransactions in the assistant servlet as well as the external applications and systems can be started before accessing any of the ejbRetrieveXXXOutput and ejbXXXOutput methods, respectively. External applications and systems 130 that are not built on J2EE can be connected to the proxy via transacted J2EE 1.4 connectors. After having accessed any of these methods 500, the assistant servlet 600 or external application or system 130 commits the UserTransactions. If such a UserTransaction fails (rolls back) for any reason (such as an exception encountered or a failure to commit), the assistant servlet 600 or the external application or system 130 can periodically keep trying to re-run the transaction until it either succeeds or a configurable maximum number of retries has been reached. If the network connection between the VXML engine 210 and the assistant servlet 600 breaks or times out during an invocation of the assistant servlet 600 by the master script 400, however, the assistant servlet 600 will not try to re-run the latest transaction but rather wait for the master script 400 to re-request the invocation. Unless the proxy 300 becomes non-functional during the course of its operation due to a proxy software crash or a crash of the operating system/hardware of the machine(s) that the proxy 300 executes on or due to some other reason, this mechanism guarantees a once-and-only-once semantics for the deposit into and retrieval of objects from the proxy. In other words, when an external application or system 130 deposits an object into the proxy 300, even intermittent failures of the proxy 300, of the network(s) 150 connecting the two, of the operating system or hardware that the proxy executes on, or similar, will not lead to a loss or duplication of the object in the proxy 300. Likewise, if the master script 400 wants to retrieve an object from the proxy 300 and encounters some failure during the retrieval (whether it is in the VXML engine 210, the network 150, the proxy 300 itself or elsewhere along the way), the object will neither get lost nor rendered twice to the user of the personal voice assistant 120.

By using proxy EJBs rather than plain Java objects, the proxy 300 also reaps other benefits of the J2EE platform, most notably scalability, reliability, availability, and security. Moreover, a functional benefit of using EJBs is the ability of a reporting engine or other application to run SQL or EJB-QL queries against the set of proxy EJBs 500. For example, an application might be interested in retrieving the names of all users and devices that are currently connected to their personal voice assistant and could do so very easily by using an SQL or EJB-QL query.

EXAMPLES

For example, to render an initial greeting upon call establishment, the master script 400 connects to the assistant servlet 600. The assistant servlet 600 uses the identity of the user 110 of the personal voice assistant 120, conveyed to the servlet 600 through VXML subdialog parameters, retrieves the derived proxy EJB 500 for this user 110, and calls the ebjOnConnect method 500-1 on this EJB. The ejbOnConnect method 500-1 has been customized by the developer to return a potentially empty VXML subdialog. The assistant servlet 600 subsequently renders the subdialog as voice or as an audio file. The subdialog can be compiled, for example, from parameterizable templates stored in a database or in the code of the proxy 300 or retrieved from the external applications and systems 130.

After the initial greeting, the master script 400 waits for button presses (or voice commands) from the user 110. Thus, on high performance VXML engines, the master script 400 could also perform continuous voice recognition and wait for the user to speak one of a set of possible keywords. When the user 110 presses a button on the phone 115, the master script 400 forwards the button press event to the proxy 300 via the assistant servlet 600. The assistant servlet 600 then retrieves the derived proxy EJB 500 for this user 110 and calls the ejbOnKeyPress method 500-3, which creates a VXML subdialog depending on which button was pressed and returns the subdialog to the master script 400 through the assistant servlet 600. As in the case of the initial greeting, the subdialog can be compiled from a variety of sources, in most cases by executing code in the external applications and systems 130, and render output either as voice or as an audio file. Other events similarly lead to calls to derived proxy EJB methods 500 and rendering of subdialogs.

When an external application or system 130 or the proxy 300 wants to send an object, such as the result of a computation, a message, notification, alert, event or audio file, to the user 110, the external application or system 130 or the proxy 300 hands over the object to the proxy 300, which deposits the object in a proxy EJB that is assigned exclusively to the designated user 110. Specifically, the proxy 300 calls the appropriate ejbOutput method 500-6, 500-7 or 500-8 (depending on the output type) on the proxy EJB. The master script 400 periodically invokes the assistant servlet 600 in a polling loop and uses a flag to convey to the assistant servlet 600 that the assistant servlet 600 should look for the presence of new objects in the proxy EJB by calling the appropriate ejbRetrieveOutput method 500-9, 500-10 or 500-11. Retrieved objects will be used to compile a VXML subdialog within the master script 400 and deleted from the proxy EJB or marked as old.

Once the subdialog has been rendered, the master script 400 returns to the beginning of the polling loop where it waits for user button presses for a specified time (for example, 30 seconds) before repeating the polling process, as discussed above in conjunction with the forms in the master script 400 of FIG. 4.

Thus, the personal voice assistant 120 is an example of media enhancements. The exemplary personal voice assistant 120 is a master program 400 that can optionally be injected into every call and voice conference. This master program 400 can be configurable to incorporate application-specific and user-selected functionality, as discussed herein. Generally, the personal voice assistant 120 speaks a configurable greeting to a conferee upon joining a conference. It stays silent on a call until one of two events occurs:

1. The user 110 invokes the personal voice assistant 120 through pressing a key on a phone (or a spoken command).

2. A message has been sent to the user 110 as part of the execution of a flow, for example, by a communication application development and execution platform (See, U.S. patent application Ser. No. 10/955,918, entitled "Method and Apparatus for Providing Communication Tasks in a Workflow,", filed Sep. 30, 2004 and incorporated by reference above).

In the first case, the 110 user is presented with a voice menu, only audible to this user 110, that gives access to the entity relationship model, in particular, to user data and allows retrieval of information about the other conferees or parties of a call such as the current number of conferees or parties, their identities, and their locations. Moreover, the personal voice assistant 120 allows the user 110 to change settings that are in effect only for the duration of the call and that have relevance to the call. An example is the rerouting of text messages destined for the user to this call. The second case above refers to the ability of the communication application development and execution platform to send an alert to a user on a call initiated by the communication application development and execution platform. The alert translates either into a signal tone that the user 110 will hear or the voice rendition of the text of the alert, depending on the preferences of the sending flow and the recipient. In the former case, the recipient has the option of invoking the personal voice assistant at any time and retrieving the alert text then.

In addition, a user 110 can obtain information about a conference call through the shared voice channel, such as the number of participants, their names and locations, and the total elapsed time during the conference. Users can access other information in a similar fashion. The personal voice assistant 120 enables the dissemination of information on a call, the handling of alerts and whispers, as well as subscribing and unsubscribing to events, such as incoming email and instant messages. The personal voice assistant 120 works closely with the shared voice channel. The agent 120 is a largely silent companion on each call and can be activated either by the user or by events destined for a user, as previously indicated. Users can conduct private conversations with other conferees through their respective personal voice assistants 120. The personal voice assistant 120 complements a Web-based user portal that allows users to respond to requests initiated by flows and to monitor collected information as well as the display of events relevant to a user.

Personal Voice Assistant Development Platform

Figure 7:
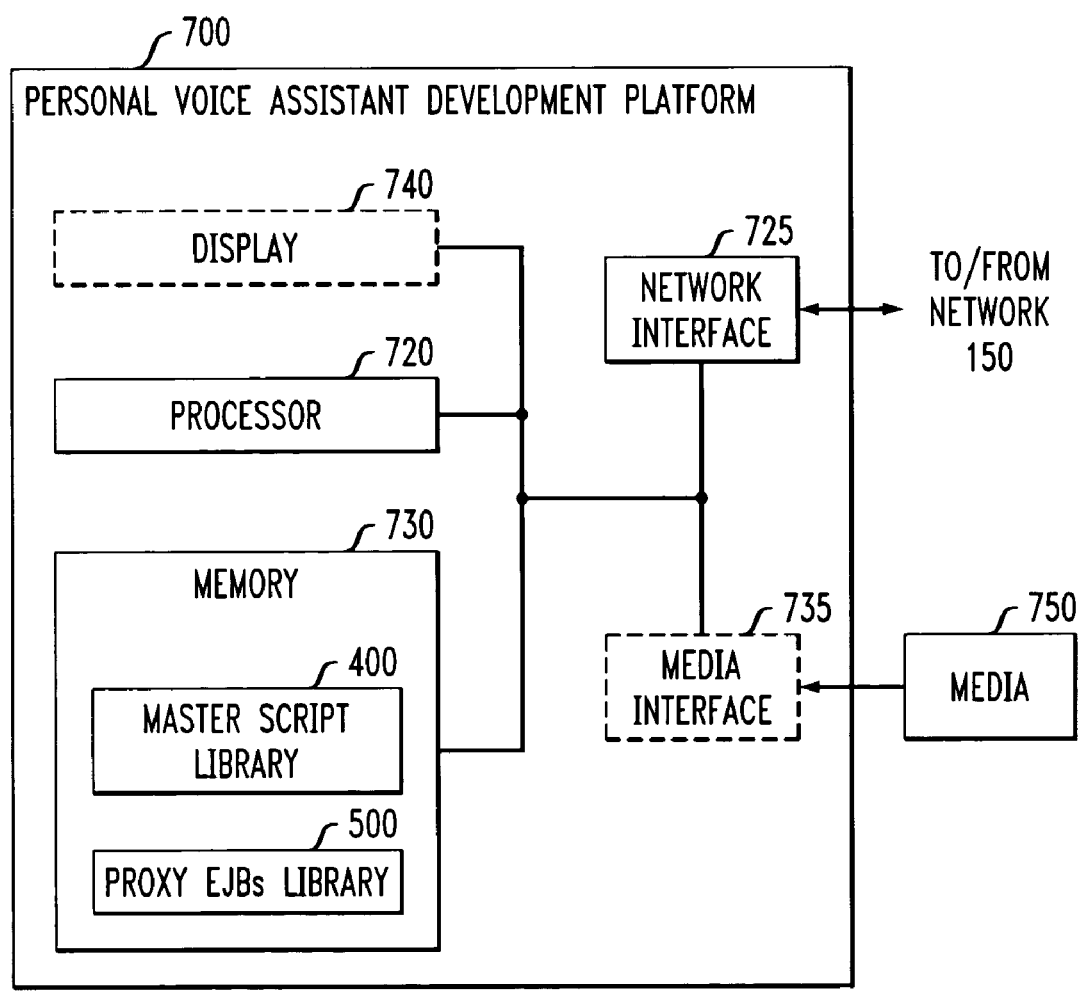
FIG. 7 is a schematic block diagram of an exemplary personal voice assistant development platform.

FIG. 7 is a schematic block diagram of an exemplary personal voice assistant development platform 700. The personal voice assistant development platform 700 provides a programming framework to generate personal voice assistants, as described herein. The personal voice assistant development platform 700 comprises a computer system that optionally interacts with media 750. The personal voice assistant development platform 700 comprises a processor 720, a network interface 725, a memory 730, a media interface 735 and an optional display 740. Network interface 725 allows the personal voice assistant development platform 700 to connect to a network 150, while media interface 735 allows the personal voice assistant development platform 700 to interact with media 750, such as a Digital Versatile Disk (DVD) or a hard drive. Optional video display 740 is any type of video display suitable for interacting with a human user of the personal voice assistant development platform 700. Generally, video display 740 is a computer monitor or other similar video display.

As shown in FIG. 7, the exemplary memory 730 stores one or more scripts in the master script template library 400 and one or more proxy EJBs in a method 500. In this manner, the personal voice assistant development platform 700 allows a developer to optionally leverage the templates in the master script template library 400 and proxy EJBs 500. For example, the proxy EJBs 500 facilitate the development process by merely requiring the developer to fill in user-specific or application-specific functionality. In addition, the developer can fully create a master script template 400, pick an existing master script template, or leverage some or all of the master script 400 from a library of available options. In addition, a proxy EJB method library can contain predefined proxy EJB methods that the developer can pick, and it can contain proxy EJB method templates that the developer can use to derive proxy EJB methods from. The developer also has the option of adding new proxy EJB methods and proxy EJB method templates to this library. For example, the library 500 may contain a fully specified ejbOnConnect method 500-1 that simply greets the associated user by username, or a template ejbOnConnect method 500-1 that greets the user with an announcement of the name of the personal voice assistant 120 and the current time and date.

The personal voice assistant development platform 700 thus generates master scripts 400 and proxy EJBs 500 that adhere to the division of labor architecture between the personal voice assistants 120 and the proxy 300.

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

We claim:

1. A method for providing a customized virtual assistant to a first party of a communication between the first party and a second party, comprising:

injecting the customized virtual assistant into the communication, wherein the customized virtual assistant comprises software that is executed on a communication terminal used by the first party for conduct of the communication; and accessing, during the communication, a virtual assistant software module for the first party from a proxy node, wherein the virtual assistant is customized by the proxy node to allow the virtual assistant software module to be selectively included in the virtual assistant based on a selection of one or more supported external applications.

2. The method of claim 1, wherein the customized virtual assistant enables two-way in-band signaling between the first party and the proxy node.

3. The method of claim 1, wherein the customized virtual assistant allows the first party to communicate with another user having an associated customized virtual assistant.

4. The method of claim 1, wherein the customized virtual assistant provides a user interface between at least one external application and the first party.

5. The method of claim 1, wherein the virtual assistant software module allows commands received from the first party to be interpreted.

6. The method of claim 1, wherein the virtual assistant software module invokes at least one subdialog provided by the proxy node.

7. The method of claim 1, wherein said proxy node provides a method that allows the first party to access functionality provided by at least one external application.

8. The method of claim 7, wherein the method is a derived proxy Enterprise Java Bean method.

9. The method of claim 1, wherein the step of accessing the virtual assistant software modules further comprises providing one or more configurable parameters to the proxy node to identify the appropriate software modules for a given communication.

10. The method of claim 1, further comprising the step of polling for information from the first user.

11. The method of claim 10, wherein the information from the first user comprises at least one of a string signal object, an audio signal object, and a video signal object.

12. The method of claim 1, further comprising the step ensuring that one or more of string, audio and signal objects are not lost.

13. The method of claim 1, further comprising the step ensuring that one or more of string, audio and signal objects are not duplicated.

14. The method of claim 1, wherein the virtual assistant is further customized by the proxy node based on a parameter of the communication.

15. The method of claim 14, wherein the parameter of the communication comprises at least one of a time of the communication and participants in the communication.

16. A system for providing a customized virtual assistant to a party of a communication, comprising:

a memory; and at least one processor, coupled to the memory, operative to:

inject the customized virtual assistant into the communication; and access a virtual assistant software module for the party from a proxy node, wherein the virtual assistant is customized by the proxy node to allow the virtual assistant software module to be selectively included in the virtual assistant based on a selection of one or more supported external applications.

17. The system of claim 16, wherein the processor is further configured to enable two-way in-band signaling between the party and the proxy node.

18. The system of claim 16, wherein the processor is further configured to allow the party to communicate with another party that has an associated customized virtual assistant.

19. The system of claim 16, wherein the processor is further configured to provide a user interface between an external application and the party.

20. The system of claim 16, wherein the virtual assistant is further customized by the proxy node based on a parameter of the communication.

21. The system of claim 20, wherein the parameter of the communication comprises at least one of a time of the communication and participants in the communication.

22. The apparatus of claim 16 wherein the communication is established independent of the customized virtual assistant.

23. A method for providing a customized virtual assistant to a party of a communication to access an external application, comprising:

customizing the customized virtual assistant by a proxy node to allow a software module to be selectively included in the virtual assistant of a user based on a selection of one or more supported external applications;

interpreting, by the proxy node, signals from the customized virtual assistant;

converting, by the proxy node, the signals from the customized virtual assistant into commands for the external application; and converting, by the proxy node, at least one of commands, messages and data from the external application into signals understood by the customized virtual assistant;

wherein the virtual assistant is injected into the communication; and wherein the communication is established independently of the customized virtual assistant.

24. The method of claim 23, wherein the step of interpreting signals from the customized virtual assistant is performed based on a virtual assistant software module.

25. The method of claim 23, wherein at least one of the steps is performed by an assistant servlet.

26. The method of claim 23, further comprising the step of providing a method that allows the party to access functionality provided by the external application.

27. The method of claim 26, wherein the at least one method is a derived proxy Enterprise Java Bean method.

28. The method of claim 23, wherein the customized virtual assistant is further customized by the proxy node based on a parameter of the communication.

29. The method of claim 28, wherein the parameter of the communication comprises at least one of a time of the communication and participants in the communication.

30. A system for providing a customized virtual assistant to allow at least one party of a communication to access an external application, comprising:

a memory; and at least one processor, coupled to the memory, operative to:

customize the customized virtual assistant to allow a virtual assistant software module to be selectively included in the virtual assistant of a given user or set of users based on a selection of one or more supported external applications;

interpret signals from the customized virtual assistant;

convert the signals from the customized virtual assistant into commands for the external application; and convert one or more of commands, messages and data from the external application into signals understood by the customized virtual assistant.

31. The system of claim 30, wherein the processor interprets signals from the customized virtual assistant based on one or more virtual assistant software modules.

32. The system of claim 30, wherein the processor is further configured to provide at least one method for the party that allows the party to access functionality provided by the external application.

33. The system of claim 32, wherein the at least one method is a derived proxy Enterprise Java Bean system.

34. The apparatus of claim 30 wherein the virtual assistant software module implements functionality that is provided at least in part by an external software application.

* * * * *